United States Patent
Avrukin et al.

(10) Patent No.: US 10,740,261 B2
(45) Date of Patent: Aug. 11, 2020

(54) SYSTEM AND METHOD FOR EARLY DATA PIPELINE LOOKUP IN LARGE CACHE DESIGN

(71) Applicant: LG ELECTRONICS INC., Seoul (KR)

(72) Inventors: Arkadi Avrukin, Santa Clara, CA (US); Thomas Zou, Santa Clara, CA (US)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 16/300,037

(22) PCT Filed: May 12, 2017

(86) PCT No.: PCT/KR2017/004969
§ 371 (c)(1),
(2) Date: Nov. 8, 2018

(87) PCT Pub. No.: WO2017/196138
PCT Pub. Date: Nov. 16, 2017

(65) Prior Publication Data
US 2019/0146922 A1   May 16, 2019

Related U.S. Application Data

(60) Provisional application No. 62/335,652, filed on May 12, 2016.

(51) Int. Cl.
*G06F 12/0862* (2016.01)
*G06F 13/16* (2006.01)
(Continued)

(52) U.S. Cl.
CPC ........ *G06F 13/1673* (2013.01); *G06F 3/0658* (2013.01); *G06F 12/084* (2013.01);
(Continued)

(58) Field of Classification Search
CPC ............ G06F 12/0862; G06F 12/0804; G06F 12/084; G06F 13/40; G06F 13/4234;
(Continued)

(56) References Cited

U.S. PATENT DOCUMENTS 5,347,642 A * 9/1994 Barratt ................ G06F 12/0866
711/113
5,740,402 A * 4/1998 Bratt .................... G06F 12/0851
711/127
(Continued)

FOREIGN PATENT DOCUMENTS

WO     2013101151    7/2013

OTHER PUBLICATIONS

PCT International Application No. PCT/KR2017/004969, Notification of Transmittal of the International Search Report and the Written Opinion of the International Searching Authority, or Declaration dated Jul. 24, 2017, 10 pages.

*Primary Examiner* — Hashem Farrokh
(74) *Attorney, Agent, or Firm* — Lee, Hong, Degerman, Kang & Waimey

(57) ABSTRACT

A system and method for early data pipeline lookup in large cache design is provided. An embodiment of the disclosure includes searching one or more tag entries of a tag array for a tag portion of the memory access request and simultaneously with searching the tag array, searching a data work queue of a data array by comparing a set identifier portion of the memory access request with one or more data work queue entries stored in the data work queue, generating a pending work indicator indicating whether at least one data work queue entry exists in the data work queue that corresponds to the set identifier portion, and sending the memory access request to the data array or storing the memory access request in a side buffer associated with the tag array based
(Continued)

on the pending work indicator and a search result of the tag array search.

21 Claims, 4 Drawing Sheets

(51) Int. Cl.

| | | |
|---|---|---|
| *G06F 13/40* | (2006.01) | |
| *G06F 13/42* | (2006.01) | |
| *G06F 12/0804* | (2016.01) | |
| *G06F 3/06* | (2006.01) | |
| *G06F 12/084* | (2016.01) | |
| *G06F 12/0897* | (2016.01) | |
| *G06F 15/78* | (2006.01) | |

(52) U.S. Cl.
CPC ...... *G06F 12/0804* (2013.01); *G06F 12/0862* (2013.01); *G06F 12/0897* (2013.01); *G06F 13/40* (2013.01); *G06F 13/4234* (2013.01); *G06F 15/7807* (2013.01); *G06F 2212/1032* (2013.01); *G06F 2212/602* (2013.01); *G06F 2212/608* (2013.01); *Y02D 10/14* (2018.01); *Y02D 10/151* (2018.01)

(58) Field of Classification Search
CPC ......... G06F 15/7807; G06F 2212/1032; G06F 2212/602; G06F 3/0658; G06F 12/0897; G06F 13/1673; G06F 2212/608; Y02D 10/14; Y02D 10/151
USPC ........................................................ 711/137
See application file for complete search history.

(56) References Cited

U.S. PATENT DOCUMENTS

| | | | |
|---|---|---|---|
| 2014/0208035 A1* | 7/2014 | Novakovsky | ....... G06F 12/0842 711/130 |
| 2014/0325153 A1 | 10/2014 | Huang | |
| 2014/0365729 A1 | 12/2014 | Evers et al. | |
| 2015/0089154 A1 | 3/2015 | Busaba et al. | |
| 2015/0347308 A1 | 12/2015 | Venkumahanti et al. | |

* cited by examiner

SYSTEM AND METHOD FOR EARLY DATA PIPELINE LOOKUP IN LARGE CACHE DESIGN

CROSS-REFERENCE TO RELATED APPLICATIONS

This application is the National Stage filing under 35 U.S.C. 371 of International Application No. PCT/KR2017/004969, filed on May 12, 2017, which claims the benefit of U.S. Provisional Application No. 62/335,652, filed on May 12, 2016, the contents of which are all hereby incorporated by reference herein in their entirety.

TECHNICAL FIELD

The present invention generally relates to device memory, and in particular, to controlling memory prefetch requests to system cache.

BACKGROUND ART

A cache memory (or simply "cache") is a relatively small and fast storage system incorporated either inside or close to a processor or between a processor and a main memory which can be realized by and referred to as dynamic random access memory (DRAM). A cache may store instructions or data, which can be quickly accessed and supplied to the processor compared to a relatively slow access time for retrieving the same information from the main memory. Data from the much larger but slower main memory is staged into the cache typically in units of transfer called "lines" or cachelines.

When a request to read data stored in memory is issued by the processor, the cache is checked to determine whether or not the data is already present in the cache. If the data being requested is stored in the cache, the cache provides the data to the processor and main memory does not have to be accessed. If the requested data is not stored in the cache, the requested data has to be fetched directly from main memory. The data from main memory is provided to the processor in response to the request and also stored in the cache in case the same data is requested again. As such, the cache is used to store frequently accessed information and improves the processor performance by delivering requested information faster than accesses to main memory. The cache may also be used to store data which is predicted to be accessed in the future, such as data related to or spatially stored proximate to data that has been fetched from main memory. The cache may also be used to store updated data which is to be written back to the main memory.

A main memory address may consist of a tag field and an index field. In a typical design, a cache memory uses a data array to store data fetched from or to be written to main memory and a tag array to store the tag addresses corresponding to the data. The index field is used to index a specific tag address stored in the cache tag array. When a memory access request from the processor is processed at the cache, the tag field indicated by the memory access request (which corresponds to the tag field of the main memory address where the data is stored in main memory) is compared with the tag addresses stored in the cache tag array. If the tag field is present in the cache tag array (which indicates that the data being requested is stored in the cache), this results in a cache "hit" and the corresponding data is read out from the cache to the processor. If the tag field is not present in the cache tag array (which indicates that the data being requested is not stored in the cache), this results in a cache "miss" since the requested data is not in the cache, and the data must be retrieved from main memory resulting in latency. In some cases, a cache miss results in a stall, wherein the operations of the processor must be halted while required data is being retrieved from main memory resulting in system slowdown.

One way to reduce the chances of a cache miss is to increase the size of the cache so that more and more data can be stored and retrieved quickly without having to retrieve data from the main memory. Thus, modern cache design implements multiple levels, designated as level 1 cache, level 2 cache, level 3 cache, and the like, which vary in size, distance from the CPU, and hierarchy in terms of order of being searched in response to a memory access request.

In some implementations, a Last Level Cache (LLC) is employed, which is typically the highest-level cache shared between multiple components and which is called last before accessing the main memory. LLC's are often prevalent in system on a chip (SOC) implementations. With the proliferation of mobile devices such as cell phones, smart phones, tablet computers, and mobile computing devices including laptop devices, increasing requirements for high level computing and power consumption management have led to further integration of several distinct processing aspects into a single microprocessor unit—or system on a chip—including graphics processing, wireless communications processing, and image processing. The deeper level of integration has increased the bandwidth and power requirements of the LLC since more and more processes are required to use the LLC.

One way to reduce the power consumption of the SOC is to increase the probability of a cache hit using the data stored in the LLC, and accordingly increasingly larger sizes of LLC may be employed. However, with the increase in size, this necessarily means that various aspects of the LLC which need to be accessed to process memory access requests, such as the tag array and data array for the LLC, are stored far apart on the SOC. Split tag array and data arrays have been implemented to allow them to operate independently, however this does not eliminate the need for communication and synchronization to efficiently process memory access requests.

In a split tag and data array design, it is difficult to maintain coherency to the same cacheline due to the distance between the array elements. For example, where a data "read" request results in a cache miss (or simply "read miss") and this is followed by a data "write" request to the same cacheline which results in a cache hit (or simply "write hit"), these two operations must be interlocked as the write hit cannot be performed before the read miss. Further, with increased load requirements for an LLC cache, memory access requests can be backed up at the data array such that pending memory access requests for a particular memory address may exist (for example in a data array work queue) while new memory access requests for the same particular memory address continue to issue. This presents an issue whereby consulting simply the tag array provides insufficient information to adequately process a new memory access request.

Most solutions implement the interlock between the tag and data array functions by either having the tag array keep track of all outstanding requests to the data array, or by having the data array keep track of all requests in a data structure such as a linked list. However, both solutions increase area, complexity, and power consumption. Accordingly, a solution is needed where requests to the data array can be checked earlier than the existing solutions, such that the tag array check and the data array work pipeline check provides a clear path for processing a particular new memory access request.

DISCLOSURE OF THE INVENTION

Technical Task

Accordingly, embodiments of the present disclosure include a system and method for early data pipeline lookup in a large cache design. In an embodiment, a new memory access request may be simultaneously sent to both the tag array and the data array to be processed. As the tag array is being searched for hit or miss information, the data array and associated data array work queue of a data processing unit may be searched to determine if there are outstanding memory access requests to the same memory location. The information returned from these simultaneous processes provides an earlier determination of a status of pending memory access requests and allows for faster determinations for handling new incoming memory access requests.

An embodiment of a method of the present disclosure includes searching one or more tag entries of a tag array for a tag address portion of the memory access request; simultaneously with searching the tag array, searching a data work queue of a data array by comparing a set identifier portion of the memory access request with one or more data work queue entries stored in the data work queue; generating a pending work indicator indicating whether at least one data work queue entry exists in the data work queue that corresponds to the set identifier portion; and sending the memory access request to the data array or storing the memory access request in a side buffer associated with the tag array based on the pending work indicator and a search result of the tag array search.

A data processing system according to an embodiment of the present disclosure may include a tag array of a cache memory; a data array of the cache memory; and cache hardware configured with logic for: searching one or more tag entries of the tag array for a tag address portion of the memory access request; simultaneously with searching the tag array, searching a data work queue of a data array by comparing a set identifier portion of the memory access request with one or more data work queue entries stored in the data work queue; generating a pending work indicator indicating whether at least one data work queue entry exists in the data work queue that corresponds to the set identifier portion; and sending the memory access request to the data array or storing the memory access request in a side buffer associated with the tag array based on the pending work indicator and a search result of the tag array search.

A machine-readable non-transitory medium of an embodiment of the present disclosure includes machine-readable non-transitory medium having stored thereon machine-executable instructions for: searching one or more tag entries of a tag array for a tag portion of the memory access request; simultaneously with searching the tag array, searching a data work queue of a data array by comparing a set identifier portion of the memory access request with one or more data work queue entries stored in the data work queue; generating a pending work indicator indicating whether at least one data work queue entry exists in the data work queue that corresponds to the set identifier portion; and sending the memory access request to the data array or storing the memory access request in a side buffer associated with the tag array based on the pending work indicator and a search result of the tag array search.

Technical Solutions

In accordance with an embodiment, a method of performing a memory access request, the method comprising: searching one or more tag entries of a tag array for a tag portion of the memory access request; simultaneously with searching the tag array, searching a data work queue of a data array by comparing a set identifier portion of the memory access request with one or more data work queue entries stored in the data work queue; generating a pending work indicator indicating whether at least one data work queue entry exists in the data work queue that corresponds to the set identifier portion; and sending the memory access request to the data array or storing the memory access request in a side buffer associated with the tag array based on the pending work indicator and a search result of the tag array search.

In accordance with an embodiment, wherein the memory access request is sent to the data array for processing when the search of the tag array for the tag portion results in a miss.

In accordance with an embodiment, wherein the memory access request is also sent to a main memory for processing.

In accordance with an embodiment, wherein the memory access request is sent to the data array for processing when the pending work indicator indicates that there are no data work queue entries in the data work queue that correspond to the set identifier portion of the memory access request.

In accordance with an embodiment, wherein the memory access request is stored in the side buffer when the pending work indicator indicates that there is at least one data work queue entry in the data work queue that corresponds to the set identifier portion of the memory access request.

In accordance with an embodiment, wherein when the pending work indicator indicates that there is at least one data work queue entry corresponding to the set identifier portion, sending the memory access request to the data array only after waiting for the at least one data work queue entry to be completed.

In accordance with an embodiment, further comprising stalling additional memory access requests while the at least one data work queue entry is completed.

In accordance with an embodiment, a data processing system comprising: a tag array of a cache memory; a data array of the cache memory; and cache memory hardware configured with logic for: searching one or more tag entries of the tag array for a tag portion of the memory access request; simultaneously with searching the tag array, searching a data work queue of a data array by comparing a set identifier portion of the memory access request with one or more data work queue entries stored in the data work queue; generating a pending work indicator indicating whether at least one data work queue entry exists in the data work queue that corresponds to the set identifier portion; and sending the memory access request to the data array or storing the memory access request in a side buffer associated with the tag array based on the pending work indicator and a search result of the tag array search.

In accordance with an embodiment, wherein the memory access request is sent to the data array for processing when the search of the tag array for the tag portion results in a miss.

In accordance with an embodiment, wherein the memory access request is also sent to a main memory for processing.

In accordance with an embodiment, wherein the memory access request is sent to the data array for processing when the pending work indicator indicates that there are no data work queue entries in the data work queue that correspond to the set identifier portion of the memory access request.

In accordance with an embodiment, wherein the memory access request is stored in the side buffer when the pending work indicator indicates that there is at least one data work queue entry in the data work queue that corresponds to the set identifier portion of the memory access request.

In accordance with an embodiment, wherein when the pending work indicator indicates that there is at least one data work queue entry corresponding to the set identifier portion, the cache hardware further configured with logic for sending the memory access request to the data array only after waiting for the at least one data work queue entry to be completed.

In accordance with an embodiment, wherein the cache hardware further configured with logic for stalling additional memory access requests while the at least one data work queue entry is completed.

In accordance with an embodiment, a machine-readable non-transitory medium having stored thereon machine-executable instructions for: searching one or more tag entries of a tag array for a tag portion of the memory access request; simultaneously with searching the tag array, searching a data work queue of a data array by comparing a set identifier portion of the memory access request with one or more data work queue entries stored in the data work queue; generating a pending work indicator indicating whether at least one data work queue entry exists in the data work queue that corresponds to the set identifier portion; and sending the memory access request to the data array or storing the memory access request in a side buffer associated with the tag array based on the pending work indicator and a search result of the tag array search.

In accordance with an embodiment, the machine-readable non-transitory medium of claim 15, wherein the memory access request is sent to the data array for processing when the search of the tag array for the tag portion results in a miss.

In accordance with an embodiment, wherein the memory access request is also sent to a main memory for processing.

In accordance with an embodiment, wherein the memory access request is sent to the data array for processing when the pending work indicator indicates that there are no data work queue entries in the data work queue that correspond to the set identifier portion of the memory access request.

In accordance with an embodiment, wherein the memory access request is stored in the side buffer when the pending work indicator indicates that there is at least one data work queue entry in the data work queue that corresponds to the set identifier portion of the memory access request.

In accordance with an embodiment, further having stored thereon machine-executable instructions for wherein when the pending work indicator indicates that there is at least one data work queue entry corresponding to the set identifier portion, sending the memory access request to the data array only after waiting for the at least one data work queue entry to be completed.

In accordance with an embodiment, further having stored thereon machine-executable instructions for stalling additional memory access requests while the at least one data work queue entry is completed.

ADVANTAGEOUS EFFECTS

Description of Drawings

The above and other aspects and features of the present disclosure will become more apparent upon consideration of the following description of embodiments, taken in conjunction with the accompanying drawing figures.

BEST MODE FOR INVENTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Figure 1:
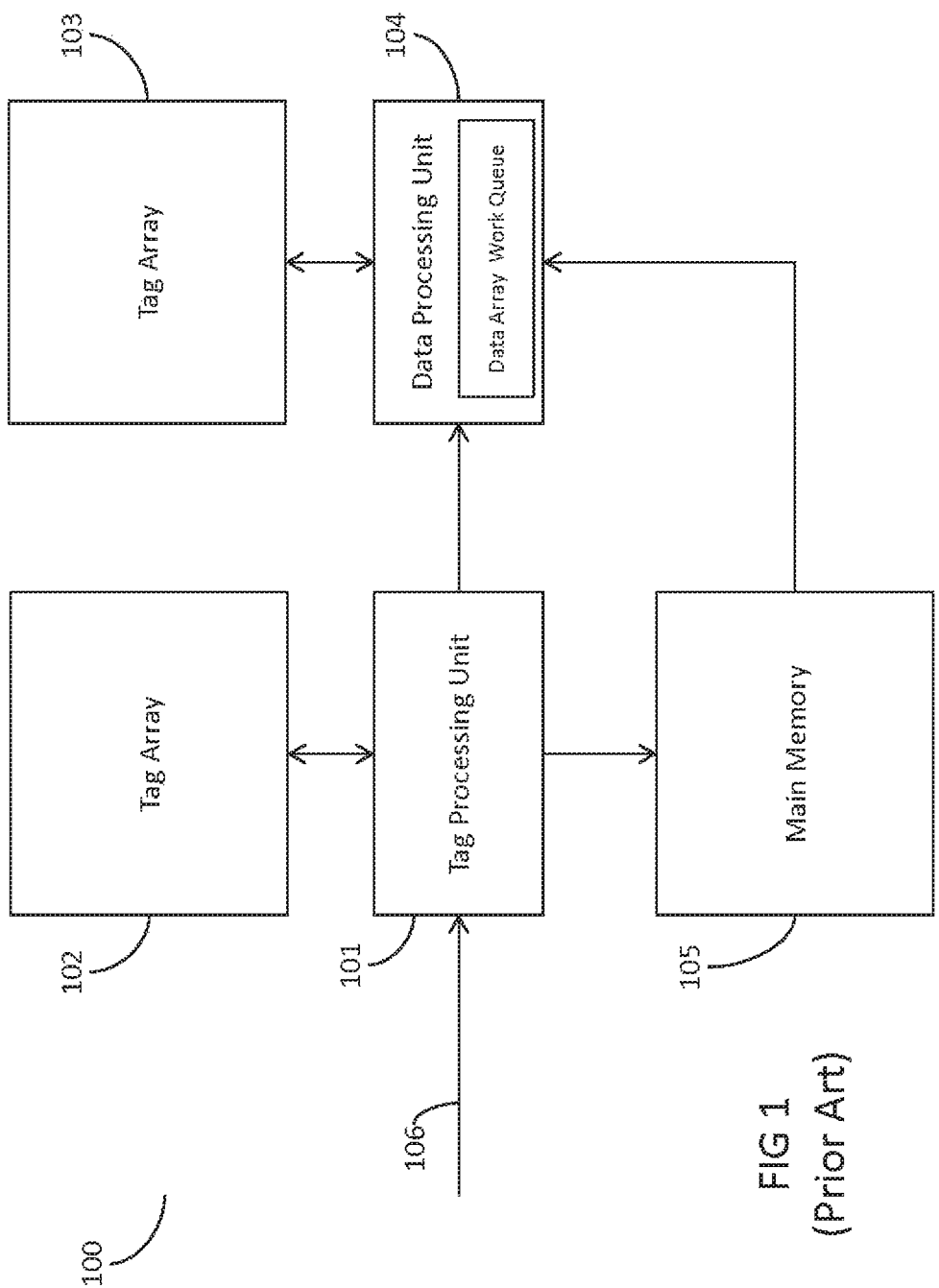
FIG. 1 is a block diagram of a memory system for processing memory access request of the related art.

Referring to FIG. 1, a simplified block diagram of a memory system 100 for processing a memory access request 106 of the related art is depicted. The depicted memory system 100 may include a tag array 102 and a data array 103, wherein the tag array 102 is used to store memory addresses corresponding to the data stored in the data array 103. As discussed, the data array 103 may store and stage data that has been retrieved from the main memory 105 for future access. In other cases, the data array 103 may be used to store data which has been updated by the microprocessor (not depicted) and needs to be written back to the main memory 105.

In such cases, the tag array 102 may include an indicator, such as a dirty bit, to indicate which data array entries in the data array 103 still need to be updated to main memory. In other cases, the data array 103 may also pre-load and stage data that is predicted to be required or having a high probability of being accessed by the microprocessor. This may be determined by cache memory selection logic and consider a variety of factors including spatial locality with data that has already been retrieved and stored into the data array such as "way prediction" or "blocking", "pre-fetching," and the like.

In one example, a memory access request 106 may be issued by the microprocessor, or other component or associated software of the SOC, such as a graphics processor (GPU), video processing components, camera and imaging processing components, wireless communications devices, and the like (not depicted). The incoming memory access request may be issued to the tag processing unit 101. Tag processing unit 101 may correspond to a separate cache controller implemented by hardware or software and configured to process memory access requests at the tag array, or in other cases tag processing unit 101 may corresponding to operations performed by hardware logic, control circuitry, or cmos gates to process memory access requests at the tag array. Provided with a memory access request, tag processing unit 101 may perform a comparison between the tag portion of the memory access request with each entry stored in the tag array 102.

The tag portion of the memory access request corresponds to the memory address being requested to be read or written by the request. If an entry exists at the tag array 102 which matches the tag portion of the memory access request (cache hit), the tag processing unit 101 determines that the requested data is stored in the data array 103 and sends the memory access request to the data pipeline, including data processing unit 104. The data processing unit 104, which includes a data array work queue (both referred to herein as 104) may be configured to process the memory access request received from the tag array 102 and tag processing unit 101.

The data pipeline, including the data processing unit and the data array work queue 104 may store pending transactions for processing at the data array 103, including read requests and write requests at the data array 103. The data processing unit 104 may correspond to a separate controller implemented by hardware or software and configured to process memory access requests at the data array, or in other cases data processing unit 104 may correspond to operations performed by hardware logic, control circuitry, or CMOS gates to process memory access requests at the data array.

In the case of a cache miss at the tag array 102, tag processing unit 101 may send the memory access request to the data processing unit along with instructions for the data array to wait to receive data retrieved directly from main memory 105. The data array work queue 104 may be implemented by a linked list. Accordingly, the memory access request may be concurrently sent to main memory 105 for retrieval of the requested data from main memory 105.

The retrieved data may be provided to the data array from main memory 105 to the data array work queue 104 for storing in the data array 103. In some embodiments, once the retrieved data is stored in the data array 103, the memory access request is performed again beginning at the tag processing unit 101 which will now result in a cache hit with the newly stored data array entry. In some configurations, the main memory 105 may also provide the retrieved data directly to the microprocessor in response to the memory access request. As for the tag array 102 following the cache miss, after sending the memory access request to both the data array work queue 104 and to the main memory 105 for retrieval, the tag array 102 may store the tag portion of the memory access request in an array position within the tag array 102 since the data to be retrieved will be stored in the data array 103 once retrieved from main memory 105.

However, in cases where the data retrieval and storage into the data array 103 is delayed due to preexisting or higher priority transactions at the data array 103, this can cause an issue wherein the tag array 102 includes an array entry which matches the tag of the memory access request but the data array 103 does not yet have an entry which corresponds to the matched tag entry and does not yet have an entry which stores the actual data being requested. This may be the case for a number of clock cycles of the microprocessor while all pending transactions of the data array 103 are being processed from the data array work queue 104, or while the requested data is being retrieved from the larger and slower main memory 105.

During this time, if a next or subsequent memory access request is issued by the microprocessor which requests a read of the same data or data stored at another memory location but corresponding to the same cacheline, the tag array 102 may return a cache hit even though the first memory access request for loading the first requested data is still pending in the data array work queue 104 and the requested data (with the associated cacheline) is not yet stored in the data array 103. Accordingly, the second memory access request is sent to the data array work queue 104 and the second memory access request must remain pending in the data array work queue 104 until the first memory access request is fully processed and the data and associated cacheline is loaded into the data array 103.

The above implementation of the existing art may result in excessive system stalling while waiting for all pending work queue entries are processed at the data array 103. As mentioned, some attempts at solving this issue have involved tracking the pending status or completion of the first memory access request at the tag array 102, for example in the form of a pending bit, where a 1 bit value is associated with each particular tag array entry and indicates that a memory access request transaction has been sent to the data array work queue 104 for that tag address which has not been completed yet. In a case of a tag hit where the pending bit is set to 1, the tag processing unit 101 may store the memory access request in a side buffer (not depicted) for retrying and resending to the data array work queue 104 at a later time.

Once the data array work queue 104 processes a particular transaction from the queue, the work queue 104 may send a signal to clear the particular pending bit associated with the tag array entry, thereby setting the bit value to 0 to indicate that the transaction has been completed and no pending transactions exist for that address. However, this implementation only provides information of the existence of a pending transaction, but it does not provide any details as to whether there are more than one transactions pending in the data array work queue 104 associated with the tag address, and the information provided only sheds light on the particular tag address, instead of status information for the particular ways associated with a cache set in a set associative cache. Other ways around this include keeping a full list of all pending transactions at the tag array 102 to have all the information at a single location accessible at tag processing unit 101, but this comes at a great cost in terms of storage and data.

Thus, embodiments of the present invention relate to a system and method for early data pipeline lookup in a large cache design. In an embodiment, a new memory access request may be simultaneously sent to both the tag array 102 and the data array 103 to be processed.

Figure 2:
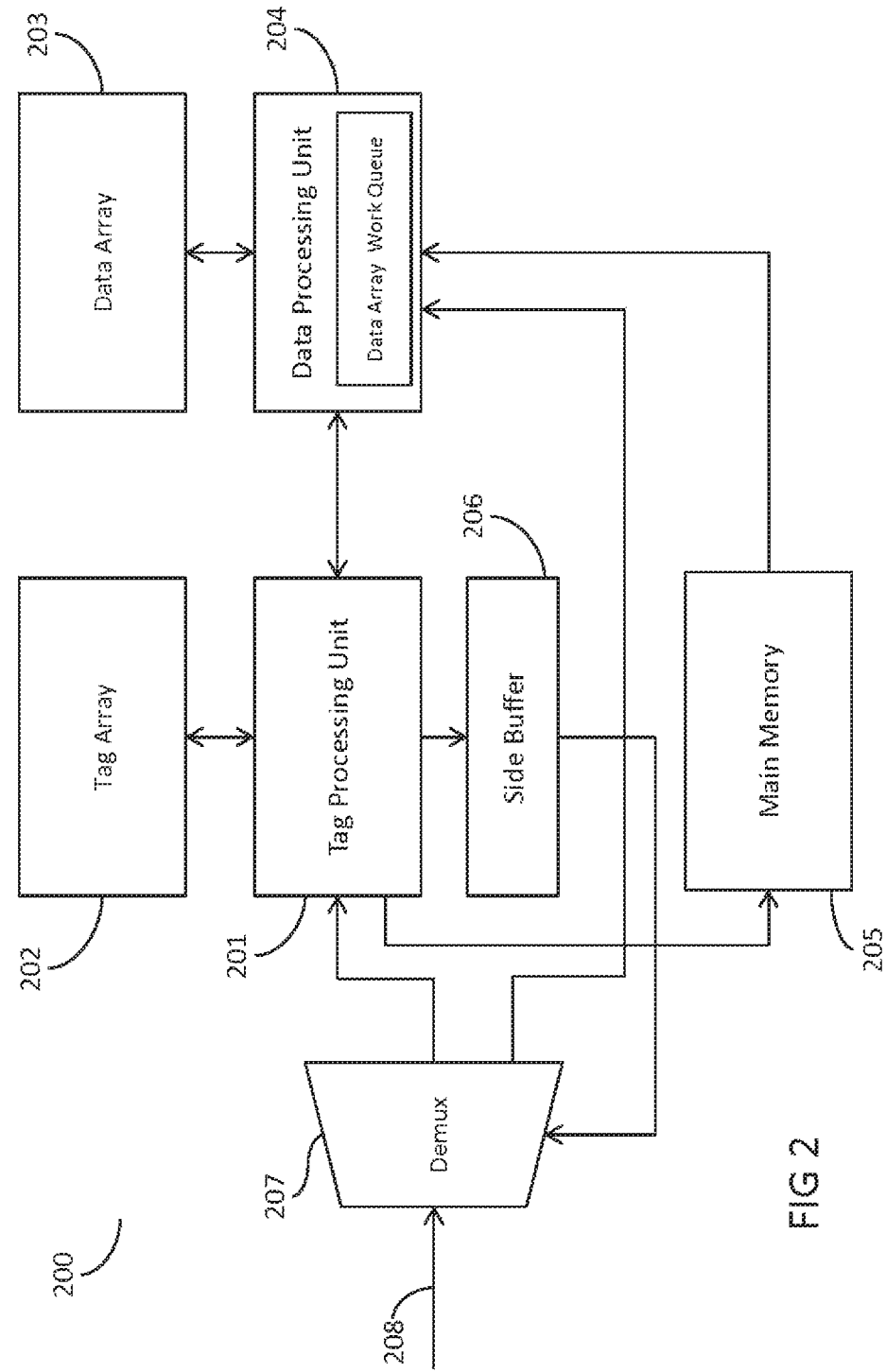
FIG. 2 is a block diagram of a memory system for processing memory access request according to an embodiment of the present invention.

Referring to FIG. 2, a simplified block diagram of a memory system 200 for processing memory access request 208 according to an embodiment of the present disclosure is depicted. As shown in FIG. 2, an embodiment may utilize a demultiplexer 207 (or demux) implemented by hardware, including control circuitry, or software which receives a memory access request from the microprocessor and sends information of the memory access request simultaneously to both the tag processing unit 201 and to the data processing unit 204 which includes the data array work queue (both referred to herein as 204). The tag processing unit 201 may correspond to a separate controller implemented by hardware or software and configured to process memory access requests at the tag array, or in other cases tag processing unit 201 may correspond to operations performed by hardware logic, control circuitry, or cmos gates to process memory access requests at the tag array. The data processing unit 204 may correspond to a separate controller implemented by hardware or software and configured to process memory access requests at the data array and data array work queue, or in other cases data processing unit 204 may correspond to operations performed by hardware logic, control circuitry, or cmos gates to process memory access requests at the data array or data array work queue.

The information of the memory access request 207 sent to the tag processing unit 201 may include the tag address portion of the memory access request for searching for matching tag entries in the tag array 202. The information sent to the tag processing unit 201 may also include the cache set information as well from the memory access request. The information sent to the data array work queue 204 from the demux 207 may include set information from the memory access request which indicates the index associated with the memory address being requested. The information sent to the data array work queue 204 may also include offset information from the memory access request which indicates the desired data within the stored data block within the cache line stored at the data array.

As the tag array 202 is being searched for hit or miss information, the data array work queue 204 may be simultaneously searched to determine if there are any pending memory access requests to the same memory location referenced by the incoming memory access request. If a particular index is matched to a work entry in the data array work queue, additional searching may be performed to determine which ways within the cache set are being utilized by the pending work entry.

For example, in a 4-way associative cache, since each cache line, or index, may correspond to four different memory addresses, or ways, the search may determine which ways are being accessed by the pending work entries in the data array work queue 204 matching the index value. Accordingly, indicator values, such as busy bits may be generated to indicate whether each way of a set of interest is busy based on pending work entries in the data array work queue 204.

In the above 4-way associative cache example, the data array work queue 204 may generate a 4-bit vector, or other appropriate data structure, where each bit indicates whether an associated way of the set is busy (whether the way has pending work entries in the data array work queue 204). Thus, a busy-per-way (BPW) vector returned from the data array work queue 204 back to the tag processing unit 201 may consist of 4 bit values: "0, 1, 0, 0" to indicate that way 2 of this particular cache set is the subject of a pending work entry at the data array work queue 204.

In some embodiments, the data array work queue 204 may stop once it has matched a pending work entry in the data array work queue 204 with the set information provided for the incoming memory access request. Thus, in these embodiments, the BPW vector will only include one busy bit in the BPW vector for the first work entry located.

In other embodiments, the data array work queue 204 may search through all work entries in the data array work queue 204 so it may locate multiple work entries for a particular cache set, where the multiple work entries are for the same or different ways of the particular set. So in some embodiments, it may be possible for the BPW vector to include multiple busy bit values, for example "1, 0, 0, 1"; "0, 1, 1, 1"; or "1, 1, 1, 1" to indicate whether ways 0, 1, 2, 3 of the set are busy.

As discussed, the above search through the data array work queue 204 is being performed simultaneously with the search through the tag array 202 by tag processing unit 201 since the request information is sent to both the tag processing unit 201 and the data array work queue 204 simultaneously by demux 207.

As discussed with respect to FIG. 1, tag processing unit 201 will cause the entries of the tag array 202 to be searched for the tag portion of the incoming memory access request. If the search in the tag array 202 locates a matching entry, this indicates a cache hit has occurred (i.e., that the data corresponding to the memory address is loaded in the data array 203). If the search in the tag array 202 does not locate a matching entry, this indicates that a cache miss has occurred (i.e., that the data corresponding to the memory address is not loaded in the data array 203).

Simultaneously or near simultaneously with obtaining the cache hit or miss information from the tag array 202, tag processing unit 201 will receive the BPW vector from the data array work queue 204.

In the case of a cache hit at the tag array 202, the tag processing unit 201 may consult the BPW vector received from the data array work queue 204 to evaluate whether there exists any pending work entries in the data array work queue 204 for the data which is loaded in the data array 203 (as indicated by the cache hit).

If there exists a pending work entry in the data array work queue 204 for the particular data array index, the tag processing unit 201 may determine that the incoming memory access request needs to be retried, or "replayed", at a later time and accordingly store the incoming memory access request in a side buffer 206, in some cases referred to as a replay queue. After a particular number of clock cycles or instructions processed, the side buffer 206 may be configured to send the stored memory access request again to the demux 207 for processing according to the operations discussed above, and continuing further below.

In the case of a cache hit where there are no pending work entries in the data array work queue 204 for the particular data array index (BPW vector bit value is 0 for the particular set and/or way), the tag processing unit 201 may send the incoming memory access request to the data array work queue 204 to be added to the queue for processing at the data array 203.

In the case of a cache miss at the tag array 202, the tag processing unit 201 may consult the BPW vector received from the data array work queue 204 to evaluate whether there exists any pending work entries in the data array work queue 204 which match the cache set and/or way of the incoming memory access request. If there are no pending work entries, the tag processing unit 201 may send the incoming memory access request to the data array work queue 204 without concern regarding which index of the data array the memory access request is written since there are no conflicts. The tag processing unit 201 may determine which existing data array entry to evict according to a predefined eviction policy, or in some cases according to a random eviction policy, and provide the memory access request to the data processing unit and the data array work queue for writing new data of the incoming memory access request into the data array at the selected data array entry location.

However, if there are one or more pending work entries in the data array work queue 204 according to the BPW vector, the tag processing unit 201 may determine which way of the set is busy according to the bits of the BPW vector, and make a determination as to which data array index and way should be replaced. For example, if the BPW vector returns that way 2 of the particular set corresponding to the memory address of the incoming memory access request is busy ("0, 0, 1, 0"), tag processing unit 201 may send the incoming memory access request to the data processing unit 204 with instructions to write the data for the incoming memory access request to one of way 0, 1, or 3 of the array index corresponding to the set.

Figure 3:
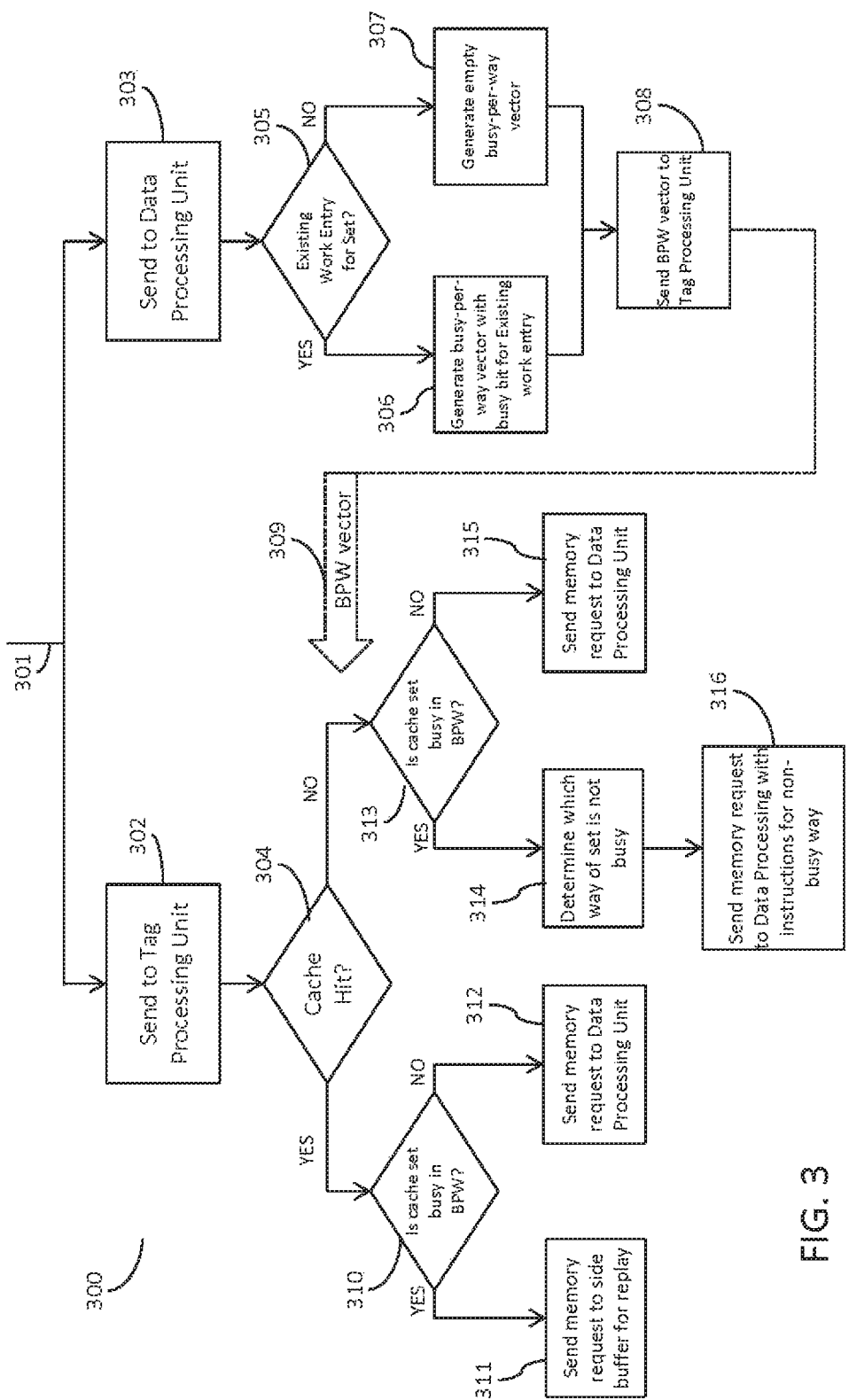
FIG. 3 is a flowchart of a method for processing a memory access request according to an embodiment of the present invention.

Referring now to FIG. 3, a flowchart 300 of a process for performing a memory request according to an embodiment of the present disclosure is depicted. The operations of the depicted process may be performed by hardware logic, control circuitry, cmos gates, software, or other hardware or software components of a cache system according to the present disclosure. As shown, a memory access request may be issued at 301 by microprocessor or other component including a graphics processing unit (GPU), processors for video, camera, wireless communication units, and the like. The memory access request may be sent simultaneously to the tag processing unit 302 and also the data processing unit 303, by a demultiplexer or other hardware or software component.

At the data processing unit, it is determined at 305 whether there are any existing work entries in the data array work queue that correspond to the same cache set as the incoming memory access request. If there are, the process goes to 306 where a bits-per-way (BPW) vector is generated with an indicator bit for the particular way of the set that is the subject of the existing work entry. As discussed, all of the work entries may also be searched, so the BPW vector may have more than one busy indicator bit as there may be multiple work entries for the cache set, corresponding to different ways of the set.

If the determination at 305 shows there are no existing work entries corresponding to the same cache set, an empty BPW vector may be generated at 307. In some embodiments, 307 may not be performed and simply a null indicator may be sent to tag processing unit to indicate that no exiting work entries were found. In the example shown in FIG. 3, the process then sends the BPW vector (with or without busy indicator bits) to tag processing unit at 308. The BPW vector may be sent to the tag processing unit simultaneously with the tag processing unit searching the tag array to determine a cache hit or a cache miss (indicated by arrow 309).

Simultaneously with the above, when the memory access request is received by the tag processing unit, the tag array is searched at 304 for the tag of the memory access request to determine whether the corresponding memory address is already stored in the data array. If the tag is located in the tag array and a cache hit occurs, the process includes determining at 310 whether the particular cache set is busy with a pending work entry as indicated by the BPW vector received at 309. If the cache set is busy, the process may proceed to 311 where the memory access request is sent to the side buffer for storage and replay at a later clock cycle.

If at 310 it is determined that the cache set is not busy as indicated by the BPW vector, the memory access request may be sent to the data processing unit at 312 for entry into the data array work queue and processing at the data array.

If a cache miss occurs at 304, the process determines whether the cache set corresponding to the memory access request is busy with a pending work entry as indicated by the BPW vector received at 309. If the cache set is busy, the BPW vector further indicates which way of the particular set is busy, according to the bit values within the vector. At 314, the non-busy ways of the set are determined and at 316, the memory access request is sent to the data processing unit with instructions for a non-busy way to be used in processing the accompanying memory access request. It is noted that the determination of the non-busy ways may be performed upon receiving the BPW vector and is not necessarily a separate operation or step as discussed with respect to FIG. 3, which is only by way of example.

If it is determined at 313 that there are no existing work entries for the cache set corresponding to the incoming memory access request as indicated by the BPW vector, the memory access request may be sent to the data processing unit. In this case it is a cache miss, and the BPW vector indicates that there are no conflicting existing work entries in the data array work queue, thus the memory access request may be processed by the data processing unit without regard to conflicts with existing memory tasks.

Figure 4:
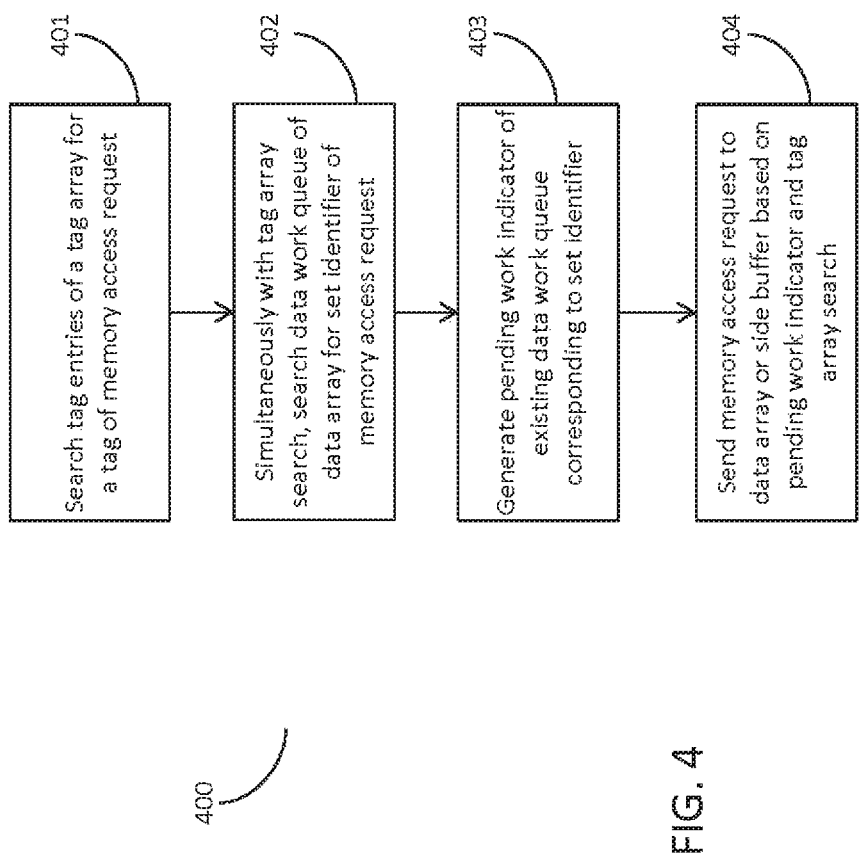
FIG. 4 is a flowchart of a method for processing a memory access request according to another embodiment of the present invention.

Referring now to FIG. 4, a flowchart for a method of performing a memory request according to another embodiment of the present disclosure is depicted. An embodiment of the method may include searching one or more tag entries of a tag array for a tag portion of the memory access request at block 401. In the embodiment, at 402 the method includes simultaneously with searching the tag array, searching a data work queue of a data array by comparing a set identifier portion of the memory access request with one or more data work queue entries stored in the data work queue, then at 403 generating a pending work indicator indicating whether at least one data work queue entry exists in the data work queue that corresponds to the set identifier portion. The embodiment of the method may further include at block 404 sending the memory access request to the data array or storing the memory access request in a side buffer associated with the tag array based on the pending work indicator and a search result of the tag array search As discussed, systems and methods according to embodiments of the present disclosure relate to checking a data pipeline earlier than the existing solutions. The information returned from the simultaneous processes of checking the tag and the data pipeline provides an earlier determination of pending memory access requests and allows for faster determinations for handling new incoming memory access requests.

The various components, elements, devices, modules, terminals, methods, and the like discussed herein, including the tag processing unit, tag array, data processing unit, data array, demultiplexer, main memory, and the like may be implemented by one or more hardware components or units, or on a computer by execution of software comprising machine instructions read from non-transitory computer-readable medium. In certain embodiments, the above systems and methods maybe implemented via one or a combination of hardware and software, and hardware implementing one or more aspects of this disclosure may be implemented using a single hardware component, including hardware comprising or configured with logic, circuitry, hardware processor units, cmos gates, hardware memory devices, hardware memory controllers, and the like.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method of performing a memory access request, the method comprising:
searching one or more tag entries of a tag array for a tag portion of the memory access request;
simultaneously with searching the tag array, searching a data work queue of a data array by comparing a set identifier portion of the memory access request with one or more data work queue entries stored in the data work queue;
generating a pending work indicator indicating whether at least one data work queue entry exists in the data work queue that corresponds to the set identifier portion; and
sending the memory access request to the data array or storing the memory access request in a side buffer associated with the tag array based on the pending work indicator and a search result of the tag array search.

2. The method of claim 1, wherein the memory access request is sent to the data array for processing when the search of the tag array for the tag portion results in a miss.

3. The method of claim 2, wherein the memory access request is also sent to a main memory for processing.

4. The method of claim 1, wherein the memory access request is sent to the data array for processing when the pending work indicator indicates that there are no data work queue entries in the data work queue that correspond to the set identifier portion of the memory access request.

5. The method of claim 1, wherein the memory access request is stored in the side buffer when the pending work indicator indicates that there is at least one data work queue entry in the data work queue that corresponds to the set identifier portion of the memory access request.

6. The method of claim 1, wherein when the pending work indicator indicates that there is at least one data work queue entry corresponding to the set identifier portion, sending the memory access request to the data array only after waiting for the at least one data work queue entry to be completed.

7. The method of claim 6, further comprising stalling additional memory access requests while the at least one data work queue entry is completed.

8. A data processing system comprising:
a tag array of a cache memory;
a data array of the cache memory; and
cache memory hardware configured with logic for:
searching one or more tag entries of the tag array for a tag portion of the memory access request;
simultaneously with searching the tag array, searching a data work queue of a data array by comparing a set identifier portion of the memory access request with one or more data work queue entries stored in the data work queue;
generating a pending work indicator indicating whether at least one data work queue entry exists in the data work queue that corresponds to the set identifier portion; and
sending the memory access request to the data array or storing the memory access request in a side buffer associated with the tag array based on the pending work indicator and a search result of the tag array search.

9. The system of claim 8, wherein the memory access request is sent to the data array for processing when the search of the tag array for the tag portion results in a miss.

10. The system of claim 9, wherein the memory access request is also sent to a main memory for processing.

11. The system of claim 8, wherein the memory access request is sent to the data array for processing when the pending work indicator indicates that there are no data work queue entries in the data work queue that correspond to the set identifier portion of the memory access request.

12. The system of claim 8, wherein the memory access request is stored in the side buffer when the pending work indicator indicates that there is at least one data work queue entry in the data work queue that corresponds to the set identifier portion of the memory access request.

13. The system of claim 8, wherein when the pending work indicator indicates that there is at least one data work queue entry corresponding to the set identifier portion, the cache hardware further configured with logic for sending the memory access request to the data array only after waiting for the at least one data work queue entry to be completed.

14. The system of claim 13, wherein the cache hardware further configured with logic for stalling additional memory access requests while the at least one data work queue entry is completed.

15. A machine-readable non-transitory medium having stored thereon machine-executable instructions for:
searching one or more tag entries of a tag array for a tag portion of the memory access request;
simultaneously with searching the tag array, searching a data work queue of a data array by comparing a set identifier portion of the memory access request with one or more data work queue entries stored in the data work queue;
generating a pending work indicator indicating whether at least one data work queue entry exists in the data work queue that corresponds to the set identifier portion; and
sending the memory access request to the data array or storing the memory access request in a side buffer associated with the tag array based on the pending work indicator and a search result of the tag array search.

16. The machine-readable non-transitory medium of claim 15, wherein the memory access request is sent to the data array for processing when the search of the tag array for the tag portion results in a miss.

17. The machine-readable non-transitory medium of claim 16, wherein the memory access request is also sent to a main memory for processing.

18. The machine-readable non-transitory medium of claim 15, wherein the memory access request is sent to the data array for processing when the pending work indicator indicates that there are no data work queue entries in the data work queue that correspond to the set identifier portion of the memory access request.

19. The machine-readable non-transitory medium of claim 15, wherein the memory access request is stored in the side buffer when the pending work indicator indicates that there is at least one data work queue entry in the data work queue that corresponds to the set identifier portion of the memory access request.

20. The machine-readable non-transitory medium of claim 15, further having stored thereon machine-executable instructions for wherein when the pending work indicator indicates that there is at least one data work queue entry corresponding to the set identifier portion, sending the memory access request to the data array only after waiting for the at least one data work queue entry to be completed.

21. The machine-readable non-transitory medium of claim 20, further having stored thereon machine-executable instructions for stalling additional memory access requests while the at least one data work queue entry is completed.

\* \* \* \* \*